US010889511B2

(12) United States Patent
Clark et al.

(10) Patent No.: US 10,889,511 B2
(45) Date of Patent: Jan. 12, 2021

(54) FLUID CONDITIONING AND TREATMENT SYSTEM

(71) Applicant: AQUATRON USA, INC., Pompano Beach, FL (US)

(72) Inventors: John W. Clark, Pompano Beach, FL (US); Willi Lentelmann, Old Saybrook, CT (US)

(73) Assignee: AQUATRON USA, INC., Pompano Beach, FL (US)

( * ) Notice: Subject to any disclaimer, the term of this patent is extended or adjusted under 35 U.S.C. 154(b) by 164 days.

(21) Appl. No.: 15/138,203

(22) Filed: Apr. 25, 2016

(65) Prior Publication Data

US 2017/0295731 A1    Oct. 19, 2017

Related U.S. Application Data

(63) Continuation-in-part of application No. 15/090,492, filed on Apr. 4, 2016, now abandoned, which is a
(Continued)

(51) Int. Cl.
*C02F 1/48* (2006.01)
*C25B 1/04* (2006.01)
(Continued)

(52) U.S. Cl.
CPC .......... *C02F 1/487* (2013.01); *C02F 1/46104* (2013.01); *C25B 1/04* (2013.01); *A01G 25/00* (2013.01)

(58) Field of Classification Search
CPC ...................................................... C02F 1/487
See application file for complete search history.

(56) References Cited

U.S. PATENT DOCUMENTS 4,865,748 A * 9/1989 Morse ..................... C02F 1/487
204/555
5,052,628 A * 10/1991 Wainwright ........ A01M 7/0046
239/690
(Continued)

FOREIGN PATENT DOCUMENTS

EA           200700522 A2     2/2008

OTHER PUBLICATIONS

Aquatron Home Page By Advanced Aquatronics International, listed as copyright 2004, available online at http://www.angelfire.com/dc2/aquatron/, accessed by the Office on Mar. 19, 2018 (Year: 2004).*
(Continued)

*Primary Examiner* — Harry D Wilkins, III
(74) *Attorney, Agent, or Firm* — Daniel S. Polley, P.A.

(57) ABSTRACT

A fluid conditioning and treatment system generally comprising an electronic controller component in communication with an energy delivery module ("energy chamber") through an interconnecting cable. The electronic controller can be housed in a fiberglass enclosure and develops and transmits preprogrammed high-energy electronic signals to the energy chamber through the interconnecting cable. The energy chamber can have a series of computer designated, matched, electrodes placed through its walls. The electrodes contact the fluid flowing through the energy chamber. Each of the controllers circuit boards are programmed to produce precisely a given range of electronic output signals that when applied to the fluid accomplishes specific functions. The controller can be programmed to supply a number of electronic hits that are applied to the water as the water passes through the energy chamber.

20 Claims, 15 Drawing Sheets

Related U.S. Application Data continuation of application No. 14/993,996, filed on Jan. 12, 2016, now abandoned, which is a continuation of application No. 14/928,398, filed on Oct. 30, 2015, now abandoned, which is a continuation of application No. 14/835,203, filed on Aug. 25, 2015, now abandoned, which is a continuation of application No. 14/738,866, filed on Jun. 13, 2015, now abandoned, which is a continuation of application No. 14/674,088, filed on Mar. 31, 2015, now abandoned, which is a continuation of application No. 14/599,854, filed on Jan. 19, 2015, now abandoned, which is a continuation of application No. 14/507,109, filed on Oct. 6, 2014, now abandoned, which is a continuation of application No. 14/340,106, filed on Jul. 24, 2014, now abandoned, which is a continuation of application No. 14/243,442, filed on Apr. 2, 2014, now abandoned.

(60) Provisional application No. 61/807,509, filed on Apr. 2, 2013.

(51) Int. Cl.
*C02F 1/461* (2006.01)
*A01G 25/00* (2006.01)

(56) References Cited

U.S. PATENT DOCUMENTS

| | | | | |
|---|---|---|---|---|
| 5,304,289 A * | 4/1994 | Hayakawa | ............ | C02F 1/4602 205/701 |
| 5,326,446 A * | 7/1994 | Binger | .................... | C02F 1/487 204/663 |
| 5,435,894 A * | 7/1995 | Hayakawa | ............... | C02F 1/487 204/222 |
| 5,817,224 A * | 10/1998 | Pitts, Jr. | .................... | B03C 5/02 204/571 |
| 6,344,349 B1 * | 2/2002 | Moldavsky | ............ | C12M 47/06 422/22 |
| 7,879,208 B2 * | 2/2011 | Wu | ............................ | C25B 9/08 204/278.5 |
| 9,512,018 B1 * | 12/2016 | Kolls | ...................... | C02F 1/467 |
| 2004/0238453 A1 * | 12/2004 | Cho | ....................... | C02F 1/4602 210/702 |
| 2005/0077190 A1 * | 4/2005 | Djordjevic | ................ | B08B 3/12 205/705 |
| 2010/0101958 A1 * | 4/2010 | Holland | ................... | C02F 1/487 204/557 |
| 2011/0011801 A1 * | 1/2011 | Cho | ....................... | C02F 1/4602 210/651 |
| 2012/0186422 A1 | 7/2012 | Cuschieri | | |
| 2013/0015135 A1 | 1/2013 | Ganze | | |
| 2013/0038970 A1 * | 2/2013 | Hughes | .................... | C02F 1/487 361/56 |
| 2014/0262788 A1 * | 9/2014 | Fearon | ....................... | C02F 1/48 204/554 |
| 2017/0216793 A1 * | 8/2017 | Bloch | ................ | B01F 15/00331 |
| 2018/0186671 A1 * | 7/2018 | Perez | ....................... | C02F 9/005 |

OTHER PUBLICATIONS

Bushouse et al, "Is Wetter Water Better Water?", from South Florida Sun-Sentinel (newspaper), Jan. 2001, retrieved on Apr. 23, 2019 (Year: 2001).*

Maryvale Park—Aquatron USA, available at https://aquatronusa.com/works/maryvale-park/, accessed on Apr. 23, 2019 (Year: 2019).*

Northeast Installation—Aquatron USA, available at https://aquatronusa.com/works/northeast-installation/, accessed on Apr. 23, 2019 (Year: 2019).*

South Florida Farm—Aquatron USA, available at https://aquatronusa.com/works/south-florida-farm/, accessed on Apr. 23, 2019 (Year: 2019).*

Search Report and Written Opinion dated Aug. 24, 2017 for PCT/US2017/029022.

* cited by examiner

FLUID CONDITIONING AND TREATMENT SYSTEM

This application is a continuation-in-part of U.S. application Ser. No. 15/090,492, filed Apr. 4, 2016, which is a continuation of U.S. application Ser. No. 14/993,996, filed Jan. 12, 2016, which is a continuation of U.S. application Ser. No. 14/928,398, filed Oct. 30, 2015, which is a continuation of U.S. application Ser. No. 14/835,203, filed Aug. 25, 2015, which is a continuation of U.S. application Ser. No. 14/738,866, filed Jun. 13, 2015, which is a continuation of U.S. application Ser. No. 14/674,088, filed Mar. 31, 2015, which is a continuation of U.S. application Ser. No. 14/599,854, filed Jan. 19, 2015, which is a continuation of U.S. application Ser. No. 14/507,109, filed Oct. 6, 2014, which is a continuation of U.S. application Ser. No. 14/340,106, filed Jul. 24, 2014, which is a continuation of application Ser. No. 14/243,442, filed Apr. 2, 2014 which application claims the benefit of and priority to U.S. Provisional Patent Application Ser. No. 61/807,509, filed Apr. 2, 2013. All applications are incorporated by reference in their entireties.

FIELD OF THE INVENTION

The invention provides for a fluid conditioning and treatment system for improving water quality.

BACKGROUND

There is a need for a system that energizes water such that less water is required for crop water as well as improving the quality of the water in order to help with water conservation, as well as energy savings, while increasing crop yields. The below described system is directed to such goals and other advantages over non-treated fluids.

SUMMARY OF THE INVENTION

A fluid conditioning and treatment system is disclosed and described in detail below. The system can operate on AC or DC power sources. The application of the system can reduce the quantities of water normally provided for irrigation, because plants absorb the electrically charged water faster. Receiving the treated water also increases the plants' ability to resist insect damage and increases fertilizer release in short colder winter periods.

Some of the benefits achieved with the system and/or applying water conditioned by the system include, but are not limited to, the following: water and energy savings; faster seed germination; healthier, quicker growing, denser, more efficient root systems; faster seedling emergence; greener, more vibrant plants; healthier more productive plants; larger stem calibers; more uniform growth; thicker plant leaves; larger quantity and better bud (bloom) set; reduced insect and disease pressure; less fertilizer run off; healthier, living soil; greater crop yields; and fewer "culls".

The system generally comprises two main parts, namely, an electronic controller component and an energy delivery module ("energy chamber"). The electronic controller is in electrical communication with the energy chamber preferably through an interconnecting cable. One end of the cable is preferably plugged into an output receptacle on the electronic controller and the other end of the cable is preferably plugged into an inlet receptacle on the energy chamber. The electronic controller can be housed in a fiberglass enclosure, though such is not considered limiting and other housings can also be used and are considered within the scope of the disclosure.

The electronic controller develops and transmits preprogrammed high-energy electronic signals to the energy chamber through the interconnecting cable. The energy chamber can have a series of computer designated, matched, electrodes placed through its walls via sealing/attachment mechanisms. The electrodes contact the fluid flowing through the energy chamber. Each of the controllers circuit boards can be programmed to produce precisely a given range of electronic output signals that when applied to the fluid accomplishes specific functions. The controller can be programmed to supply a number of electronic hits that are applied to the water as the water passes through the energy chamber.

The controller generates the electronic signals that are sent to the electrodes in the energy chamber. A detailed schematic and operation for the controller of the system will be described below. Also described below is the energy chamber for the system.

In one non-limiting application, the energy chamber component can be installed in irrigation pipe lines to treat all the water passing through the system that is being applied to a crop. In passing through the system, water becomes energized, undergoing physical changes, it becomes "wetter". The "wetter" water provides significantly more efficient absorption by soil and root systems. This, in turn, allows for substantial savings in both water and energy. The system delivers an abundant supply of electrons to the water it processes which measurably increases plant voltages. These plants have more resistance to insects, disease and frost. The end result is that plants are able to absorb and process the treated water and nutrients more efficiently. The energy levels of nutrients and soil are amplified, thus more energy is carried to the plants.

DESCRIPTION OF THE INVENTION

Figure 1A:
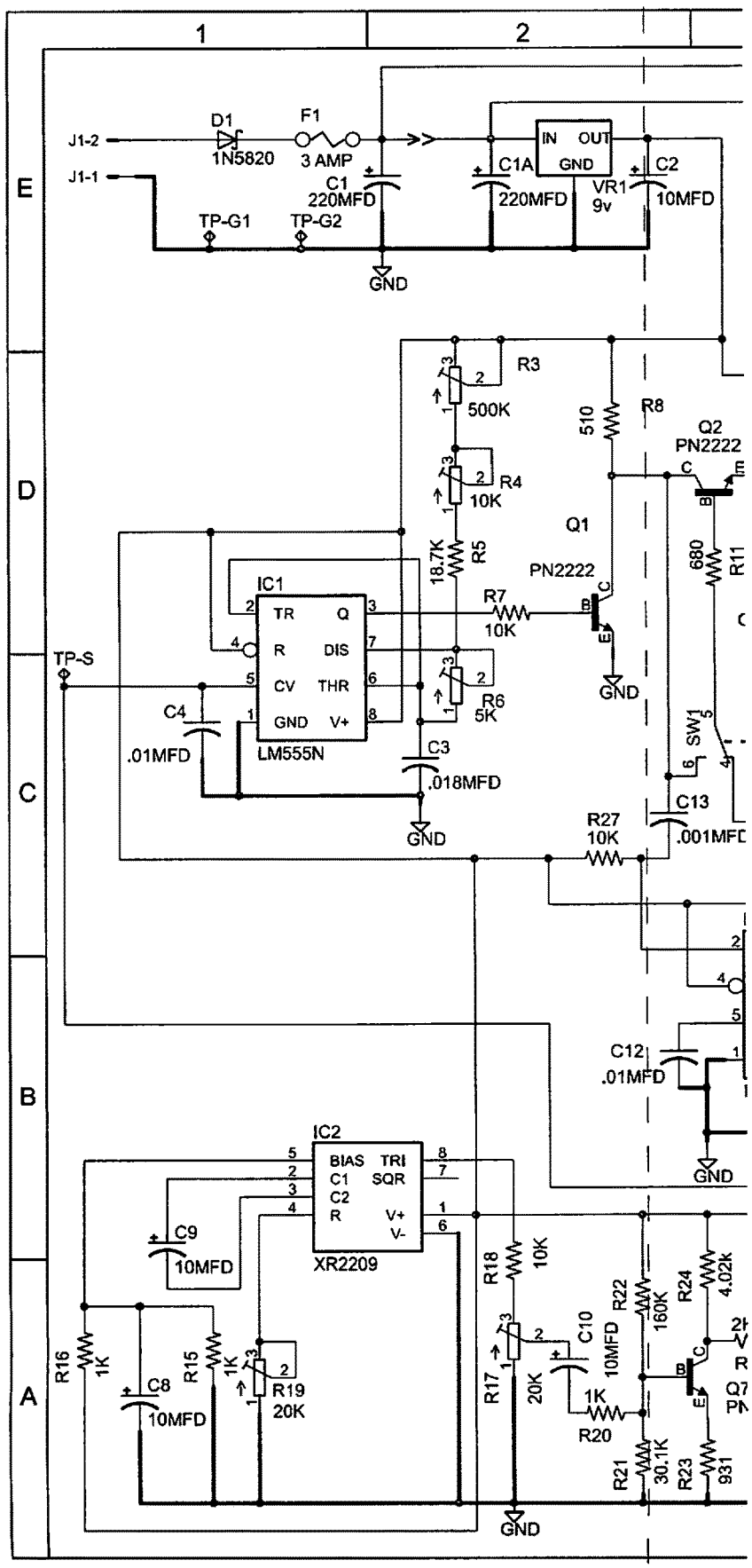
FIG. 1A, FIG. 1B and FIG. 1C combine illustrate an electrical schematic for the electronic controller of the fluid conditioning and treatment system.

As seen in FIG. 1, a schematic for the preferred embodiment of electronic controller for the fluid conditioning system is shown and the operation of the electronic controller shown in the schematic of FIG. 1 will be shown below. The description below will provide the theory of operation for the electronic controller schematic.

The system electronics preferably consist of two (2) oscillators IC1 and IC2, one (1) one shot generator, one (1) voltage regulators, one (1) signal inverter, one (1) dual noninverting high speed MOSFET driver, and two (2) power output amplifiers. Also included can be appropriate signal indicators, reverse polarity protection, and appropriate filters for voltage stability. Current sensing of each PCB output when connected to a low voltage meter that indicates peak pulse power to the output can also be included. This metering circuit can be a separate printed circuit board located on the main chassis though such is not considered limiting.

The main oscillator (IC1) can be configured as a VARIABLE PULSE WIDTH, VARIABLE PULSE RATE GENERATOR operating in the ELF spectrum. The second oscillator (IC2) can be configured as a VARIABLE TRIANGLE WAVE GENERATOR preferably operating in the sub audio spectrum. The allocated radio spectrum can be preferably located between 9 KHz and 300 GHz, while the ELF (Extremely low frequency) spectrum can be preferably between 0 to 3 kHz.

Low voltage DC (preferably 12.5 volts-15 volts) can be applied to the system via J1. D1 is a reverse polarity diode. D1 can be selected using a Schottky Barrier device resulting in a minimum voltage drop across the diode. D1 may also be utilized as a ½ wave rectifier should AC voltage be present at J1. F1 is a Fast Blow fuse acting as the main current limiting device for each printed circuit board. From the fuse, DC is distributed to a voltage regulator, LED voltage indicator; power amplifiers and other IC devices.

C1 & C1A are the main input filter to act as a buffer between other connected printed circuit boards and also act as a filter to its associated printed circuit board. C1 acts as the main buffer, stabilizing the input voltage source, during heavy pulsed current consumption. J2, pin 1 & 2 is connected to a GRN LED to indicate power is available within the PCB past the fuse. Should F1 open the green LED would not operate indicating a board failure. C1A is a filter capacitor to maintain a steady voltage to the frequency determining circuits and driving circuits. This device can be located on the Daughter PCB and preferably as close as possible to the indicated circuits.

VR1 is a 3 terminal 9-volt solid state voltage regulator. VR1 reduces and regulates the main input voltage to 9 volts to ensure stable operation of the main oscillator. C2 is a small regulator filter to eliminate any possible oscillation that may be present on the regulated buss.

The main oscillator, IC1 can be comprised of IC1, R3, R4, R5, R6, C3, & C4. IC1 is a solid state timer chip and with its associated components produce an astable operating rectangular waveform timer. Timing is determined by the components C3, R3, R4, R5, & R6. C3 with R6 determine the "ON" time or signal pulse width. C3, R3, R4, & R5 determine the OFF time of the signal pulse. R5 limits the high frequency limit as determined by formulation. R3 & R4 adjusts the full-calculated frequency range. R3 is the main or "course" frequency adjust with R4 being the "fine" frequency adjust. Therefore, with the combination of these component values, the repetition rate, or frequency rate of the pulses may be determined. The inherent characteristics of the IC is such that frequency stability is accomplished by the device switching "ON" & "OFF" at preferably the ⅓ supply voltage points. Additionally, VR1 assures additional stability. Pin 3 of IC1 is the pulsed output signal that is equal in amplitude to the supply voltage. Pin 5 of IC1 is a control pin. Under normal conditions, this pin is bypassed to ground via a small capacitor and its voltage value is approx. ½ regulated supply voltages. However, by injecting a "controlled" voltage or signal, the frequency "set point" may now be changed or varied electronically in proportion to the "control" voltage. This feature can be used in conjunction with the Secondary Oscillator to produce a "sweeping" function or "sweeping frequency" set about the center frequency setting of the main IC1 oscillator.

The Secondary Oscillator is comprised of IC2, C8, C9, R15, R16, R19, R17, & R18. IC2 can be a solid state function generator chip and with the proper external component configuration may be made to function as either a square wave or triangle wave device. Because it is desired to "sweep" the Main Oscillator frequency in the most linear manor, the triangle wave can be chosen, though such is not considered limiting. C9 & R19 determines the frequency of operation. Pin 8 of IC2 is the triangle wave output pin. Since it is desirable to control the output level and amplitude, the level is controlled by R17. Output "no signal level" is set via Q7 and associated components C10; R20; R21; R22; R23; & R24. Q8 can be configured as an emitter follower to produce a low impedance output and signal to IC1 pin 5 as well as a minimum load to Q7 signal.

The amplified value can be chosen to produce a maximum Main Oscillator deviation equal to approximately +/−55% of any selected center frequency. The present frequency control range of the Secondary Oscillator can be between 5-100 cps. The Main Oscillator frequency can deviate around its set center point in proportion to the amplitude of the sawtooth voltage applied to the Pin 5 of IC1 adjusted by R17. The rate of deviation (how many times will the Main Oscillator frequency deviate or sweep per second) can be determined by the set frequency of the Second Oscillator. To prevent the Main Oscillator from "locking" to the Secondary Oscillator frequency, the Main Oscillator lowest deviated frequency can be higher then the Secondary Oscillator set value.

Q1 can be connected as an inverting signal device. Since the pulsed signal from pin 3 of IC1 is a negative going pulse, i.e. a pulse from +supply to circuit ground, a signal inversion is employed. A positive pulse or signal is preferably used to properly TURN ON Q5 for the desired adjusted time. R7 is a current limiting resistor for the base of Q1. R8 is the load resistor for Q1. As the base of Q1 goes negative, Q1 turns ON, and the junction of Q1 collector and R8 goes to supply volts. This is the inversion process. This positive pulse is connected to an emitter follower transistor Q2 and transferred to pin 2 of IC4. To properly drive Q5, ½ of the power output stage, a low impedance noninverting driving source should be generated. This is accomplished by installing IC4, preferably a dual noninverting MOSFET driver. This device is preferred to the standard use of transistor emitter followers because of their ability to pulse high currents to the power MOSFET, Q5. This higher drive capability improves the efficiency of the power MOSFET's.

To produce a negative or opposite going signal immediately after the signal from Q5, a pulse generating device can be connected to the output of Q1. This can be accomplished by developing a triggered monostable multivibrator, IC3. This timing generator produces a timed pulse determined by C11 & R28. This timed pulse can be adjusted to be equal to the timed pulse of IC1. This device produces a timed pulse every time a falling pulse is seen on Pin 2. This pulse can be triggered on the falling edge of the pulse from Q1, as applied to pin 2 of IC3, through C13 and pull-up resistor R27.

The output pulse can be taken from pin 3 of IC3, and fed thru pins 1 & 2 of X2, thru Q3 and into the second half of IC4, the dual noninverting MOSFET driver via X2 pins 1 & 2 & Q3, an emitter follower. Therefore, what is produced is preferably a positive going pulse from pin 1 (output 1) of IC4 and a sequential positive going pulse from pin 5 (output 2) of IC4.

Outputs 1 & 2 of IC4 drive power transistors Q5 & Q6 respectfully. Q5 & Q6 can be connected to a split winding transformer with the Center Tap connected to Source Voltage (+15 VDC). With proper winding connections and with Q5 & Q6 being turned ON by their appropriate driving signal in sequence, a desired high voltage positive and negative going signal can be generated via the output winding of transformer T1. Q5 & Q6 can be high current, high voltage Avalanche Rated N-Channel Enhancement-Mode Power MOSFET's. The selected device is preferred over standard transistors in that when turned ON, it can have an internal resistance lower then 0.028 ohms. This results in almost 100% of the available power being applied to the load. Also the characteristics of the MOSFET is similar to that of an electron tube in that turn ON power requirements are more related to voltage; whereas a standard transistor requires both current and voltage. To turn ON the N-Channel device, a positive signal should be present on the Gate.

C7 is a filter capacitor to store supply voltage during the OFF time of the pulses. With isolation diode D2, this relieves the stress on the source supply voltage supply. D2 also prevents stray signals reflecting from the transformer T1 and interfering with the main source supply voltage on the circuit board. A "dummy load" resistor R34 can be connected across the transformer output. This can be installed to prevent excessively high voltages along with spurious signals under either NO LOAD conditions or should there be no liquid medium in the Energy Chamber.

To accomplish a peak pulse power reading of the output signal, a resistor R35 can be connected in series to the output. A peak to peak reading voltage detector can be connected across this series resistor R35. Since the output voltage from T1 is relative constant for load ranges between 400 to 1500 ohm (enter conductivity values) a low voltage meter (no decimal point) can be calibrated to indicate apparent peak pulse power at an equivalent 600 ohm load. Thru the use of adjustable electrodes in the energy chamber, equivalent ohmic values may be obtained around the 600 ohm point. Peak pulse power indication can have an approximate error of about 5% over a load range of 400 to 4000 ohms. When using a mater circuit during low conductivity solutions, a small spike may be present. Thus, an inductor L1 can be provided and acts as a low pass filter resulting in a rectangle wave for instant peak power readings.

The output signal from across R35 can be applied to two shocky low voltage drop shunt type peak rectifiers, D5 & D6, with their inputs in parallel. Isolation for each diode is made possible by C18 & C19. One rectifier responds to the positive half-cycle of the applied voltage, the other to the negative half cycle. The DC output of each is equal to the peak value of the corresponding half cycle. The DC output circuits of the two rectifiers are in series and thus are additive. This results in reading the peak to peak value of the output signal.

A calibration circuit for apparent power in the bilateral mode can be connected across D5 & D6 consisting of R38 & adjusting potentiometer R39. A high impedance, low voltage LCD meter can be connected to the adjustment arm of R39 and anode of D5 (detector ground) via J7, to read the applied peak to peak voltage across R35 and will simulate output load peak pulse power. For calibrating apparent power in the single pulse mode, move the two jumpers on J9 & J10 to the SIN (single) position. Use R40 to adjust the meter reading for appropriate power at approximately 560 ohms.

The following provides a description of the signal selections. A primary signal selection can be determined by SW1, which can be a double pole double throw switch. Bilateral mode of operation can be selected by SW1 pin 1 & 2 and pin 5 & 6, Jumper between pin 1 & 2 of X2. The positive pulse signal from the junction of R8 & the collector of Q1 can be applied to the ON biased transistor Q2, connected as an emitter follower. This signal can be applied to input 1 of IC4, the FET driver. The negative pulse signal can be generated from the positive pulse signal of IC 3, pin 3 (see IC3 description above). This positive pulse can be passed thru pin 1 & pin 2 of X2 and applied to the ON biased transistor Q3, connected as an emitter follower. This signal is applied to input 2 of IC4, the FET driver.

Should a single positive pulse only be desired, the jumper between pin 1 & 2 of X2 can be removed. This is just non-limiting one option of a single pulse operation. One non-limiting reason for an additional single pulse operation is under certain loads an inductive kick of opposite polarity can be present. Although this pulse is small in power it may be undesirable for certain applications. Another non-limiting single pulse option can be a high voltage full wave bridge DB1 connected across the output winding of the pulse transformer thru the series sensing resistor R35. A double positive pulse can be generated from the bridge rectifier and applied to the output header J5. This results in double the envelope power. A clean single positive pulse can be taken from one section of the bridge rectifier and applied to the output header J6. This can be used with bilateral operation.

Another non-limiting mode of output operation can be an alternate positive and negative pulse at 10 second intervals. This can be used under certain condition where electrode cleaning is desired and under certain field applications. This alternating operation can be accomplished by switching SW1 from the bilateral operation. A preferred 10 second timer, IC5 has C14, R29 and R30 as its timing components. Output is taken from pin 3 of IC5. This preferred 10 second pulse can be sent to the base of Q4 thru R31 to keep Q4 ON for 10 seconds, which allows the frequency pulse from Q1 to pass to input 1 of IC4. During the 10 second positive pulse from pin 3 of IC5, Q4 is turned ON pulling its collector to ground, which in turn turns OFF Q3. This prevents the positive pulse from pin 3 of IC3 reaching pin 4 of IC4 by turning OFF IC3, allowing only a positive output pulse from the transformer for 10 seconds. Once the 10 second timer switches, Q4 is turned OFF, now reversing the process of turning OFF Q2 and turning Q3 ON.

When operating more than 1 PCB, a Dual or Quad system, the preferred 10 second timers can be synced together so only the same pulse direction is present during each 10 second period. This can be accomplished by connecting all 10 second timers, IC5, via a syncing resistor connected to the trigger pin 6 of each IC5. The timer that transitions first forces the other timers to follow. To control excessive load conditions, high values of liquid conductivity, an adjustable power resistor R41 can be connected in series to the output signal line for each PCB. For optimum system loads, it is preferred to operate around a 500-600 ohm load. Once a resistive load of the liquid conductivity is determined, R41 can be adjusted to total the 500-600 ohm load.

The preferred system electronics design can also include switch circuitry to change from bilateral operation, to continuous 10 second operation in one polarity only and then switching to the opposite polarity and a jumper selection for continuous single polarity only. They system's electronics can also have additional output headers to select double single polarity or single pure rectangle signals all derived through the use of a custom designed pulse transformer. A sync pulse can be available to sync multiple PCBs in the auto 10 second alternating mode so pulse direction will all coincide.

The system's electronics provides for the generation of a "bilateral" output signal. The pulse widths can be adjustable from a preferred, but non-limiting, range of 50 usec to 25 usec. This results in an equivalent SINGLE BURST of between 10 kc to 20 KC with an adjustable repetition rate. The system's electronics also includes a frequency sweep circuit; and a modified meter circuit to indicate applied peak pulse power to the liquid medium. A custom pulse transformer can also be added to produce closer rectangle type signals. Additional features of the system's electronics include output circuits to convert bilateral signals to either positive or negative signals only to eliminate opposite inductive signals to the output. One objective of the "bilateral" signal is to generate an equal alternating pulse to discourage electrode contamination, scale build-up, electrode erosion and to enhance the liquid medium with larger power through a larger peak to peak voltage pulse.

As mentioned above, the energy chamber is the second major component of the fluid conditioning and treatment system. The energy chamber conveys the energy received from the controller to the fluid traveling through the energy chamber. The energy chamber can be thought as an "antenna" as it sends signals through the structured water it has created. These signals can be found both upstream and downstream of the chamber. They travel through the water in the plumbing system the chamber is attached to and in the case of irrigation systems, to the plants and soils the water is placed on.

In a preferred, non-limiting embodiment the energy chamber can be comprised of a number of electrodes that are statically arranged in an inert pipe stricter such as, but not limited to, PVC (See FIG. 4 through FIG. 10). The electrodes can be wired to, or are otherwise in electrical communication with, the energy generating section of the system, namely, the controller (See FIG. 11 through FIG. 14). In order to keep the signals from mixing, each energy producing board (circuit) of the controller can be wired to a pair of electrodes. When the electrodes are energized by electrical energy from the associated energy producing circuit of the system's electronic controller, electron energy and an array of specifically generated (or tuned) frequencies are passed through to the fluid in the chamber. This results in particles in the fluid becoming energized. Depending on the desired benefit or application (i.e. what the present invention is system is being used for), the system is programmed with an output of negative, positive or no charge at all, as desired. These specific programs will result in a related charge being placed on the outside shell of the colloids carried by the fluid, making them attach to or repel each other or remain in a neutral state.

Colloids that repel each other create a "Wetter Water" condition where the water actually acts as a surfactant. This also aids in the hydration of water which, amongst other effects, lessens the impact of sodium chloride for it places more molecules of H2O between the NaCl molecules, hydrating the solution better. This fluid penetrates better and also carries high energy electrons in abundance to the soil and plants and/or other material it penetrates. Colloids that attract each other create a clumping effect and as the particles (colloids) become attached to each other their atomic weight increases until it reaches a point where the agglomerated particles fall out of suspension. This is the same effect accomplished with the use of chemicals and/or alumina to clear water of waste, calcium, tannic acid and heme iron, etc. This also results in the development of scale in water carrying pipes, sprinkler emitters, boilers, cooling systems etc. These effects are all the result in the change on Zeta potential.

Figure 1B:
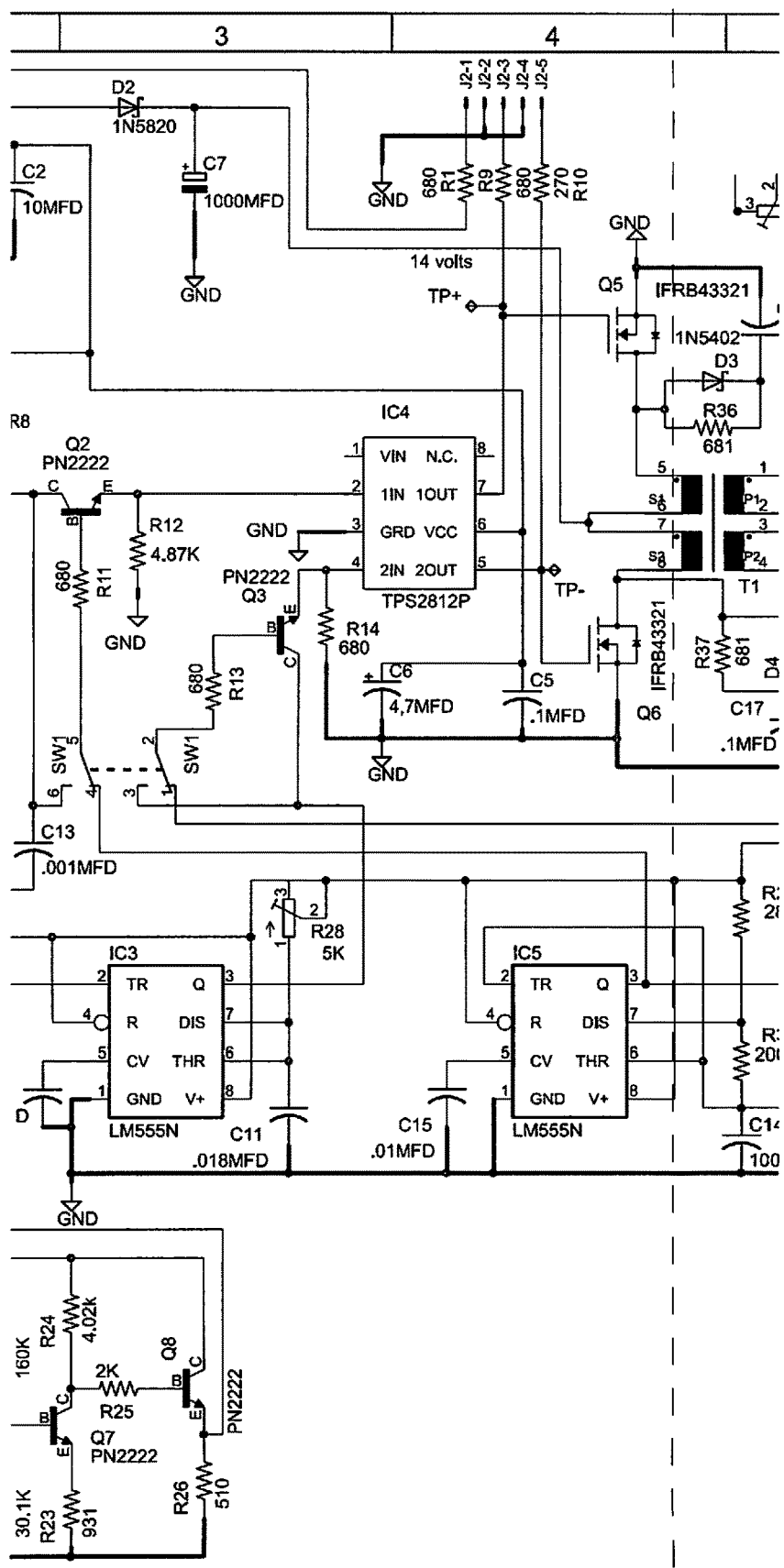
Figure 1C:
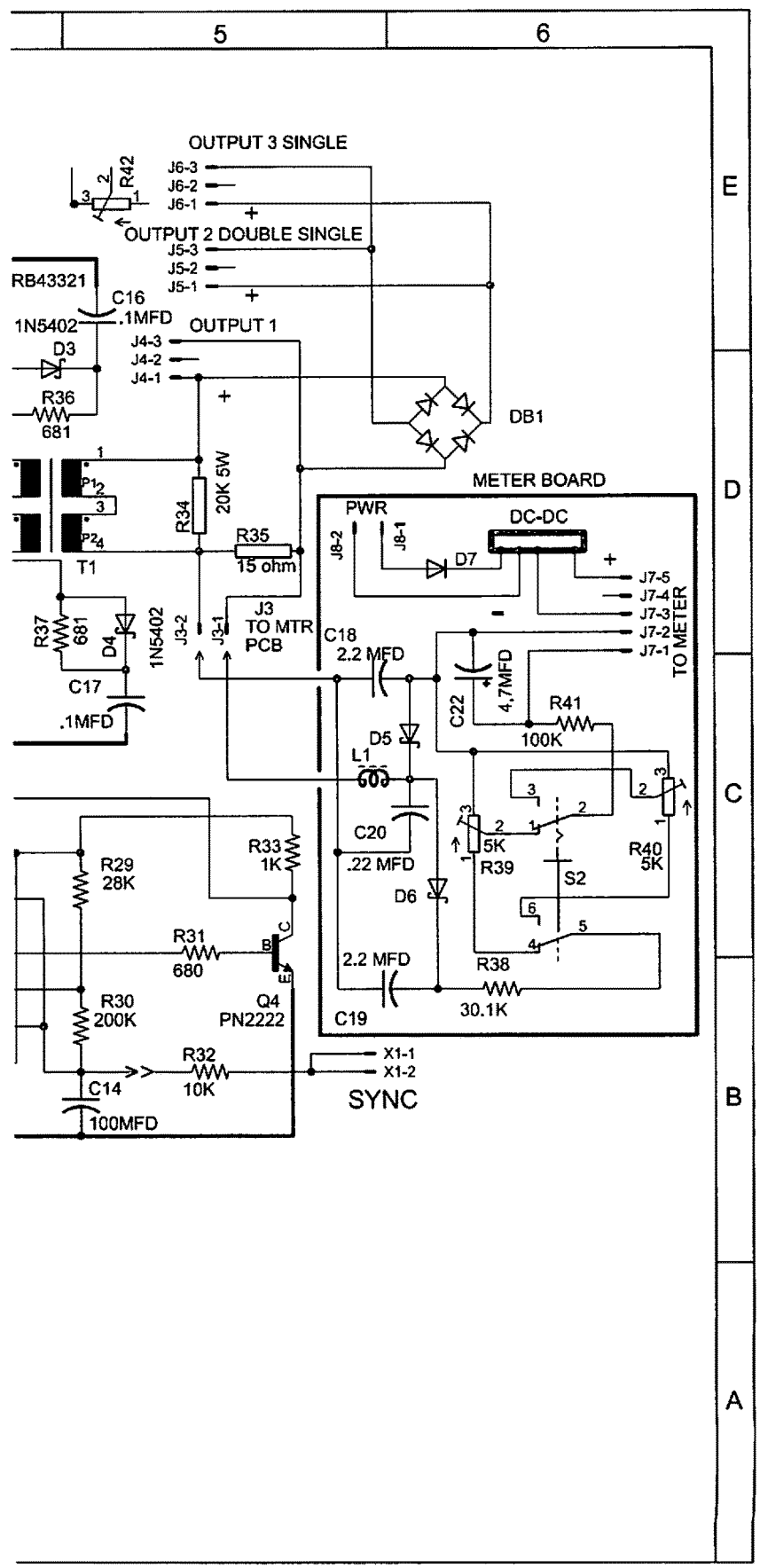

With regard to FIG. 1A, FIG. 1B and FIG. 1C; R19 is for sweep frequency; R17 is for sweep amplitude; R3 is for center frequency; R4 is for fine tuning center frequency; R6 is for positive pulse width; R28 is for negative pulse width; S2 is shown in bilateral mode; PIN1 is ground circuit power LED; Pin 3 is multi red LED; Pin 5 is multi green LED; R42 is an optional power tune for high conductivities connected to either J$-1, J5-1 or J6-1.

Figure 2:
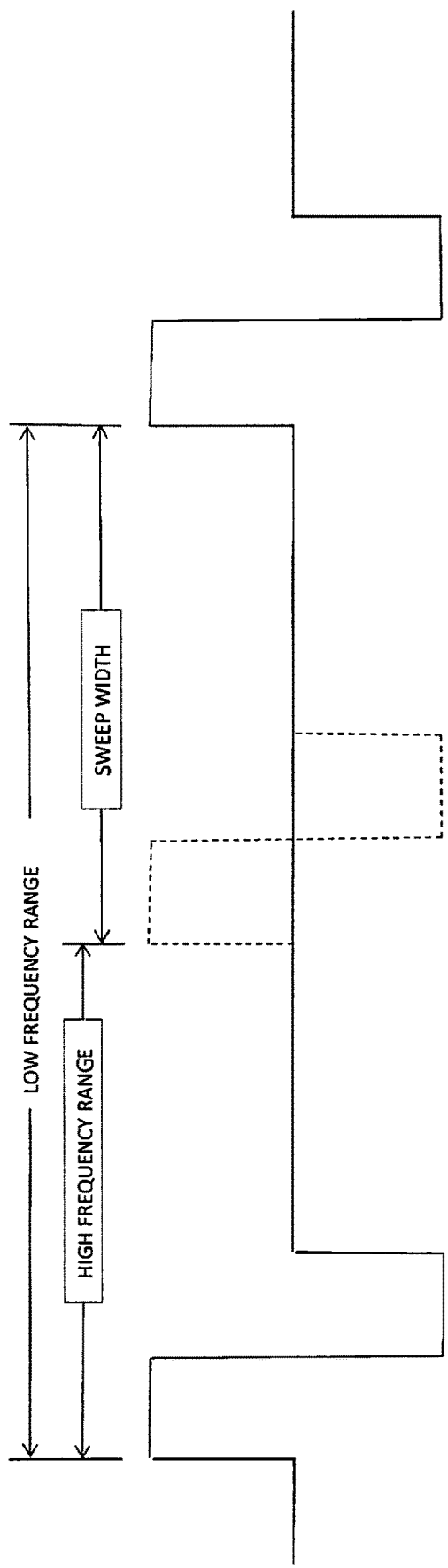
FIG. 2 is bilateral signal graph using the described electronic controller and explanation.

With regard to FIG. 2, for a single board operation, the low frequency can be 150 CPS, the High frequency can be 1650 CPS, the sweep width can be 1500 CPS, the Sweep Rep Rate can be 10-100 CPS and the Pulse Width can be 30 usec. The low and high frequency may be adjusted to any value within the indicated range. The unit can be adjusted to a specific signal frequency by adjusting the "TPS" sweep test point to zero via R17.

For a quad system operation: for board 1, the low frequency can be 250 CPS, the High frequency can be 1100 CPS, the sweep width can be 850 CPS, the Sweep Rep Rate can be 10-100 CPS and the Pulse Width can be 30 usec; for board 2, the low frequency can be 1160 CPS, the High frequency can be 1410 CPS, the sweep width can be 250 CPS, the Sweep Rep Rate can be 10-100 CPS and the Pulse Width can be 30 usec; for board 3, the low frequency can be 1420 CPS, the High frequency can be 1625 CPS, the sweep width can be 205 CPS, the Sweep Rep Rate can be 10-100 CPS and the Pulse Width can be 30 usec; and for board 4, the low frequency can be 1630 CPS, the High frequency can be 1900 CPS, the sweep width can be 270 CPS, the Sweep Rep Rate can be 10-100 CPS and the Pulse Width can be 30 usec. The low and high frequency may be adjusted to any value with the indicated range. The typical sweep rep rate can be 18 CPS. The unit can be adjusted to a specific single frequency by adjusting "TPS" sweep test point to zero via R17.

Figure 3A:
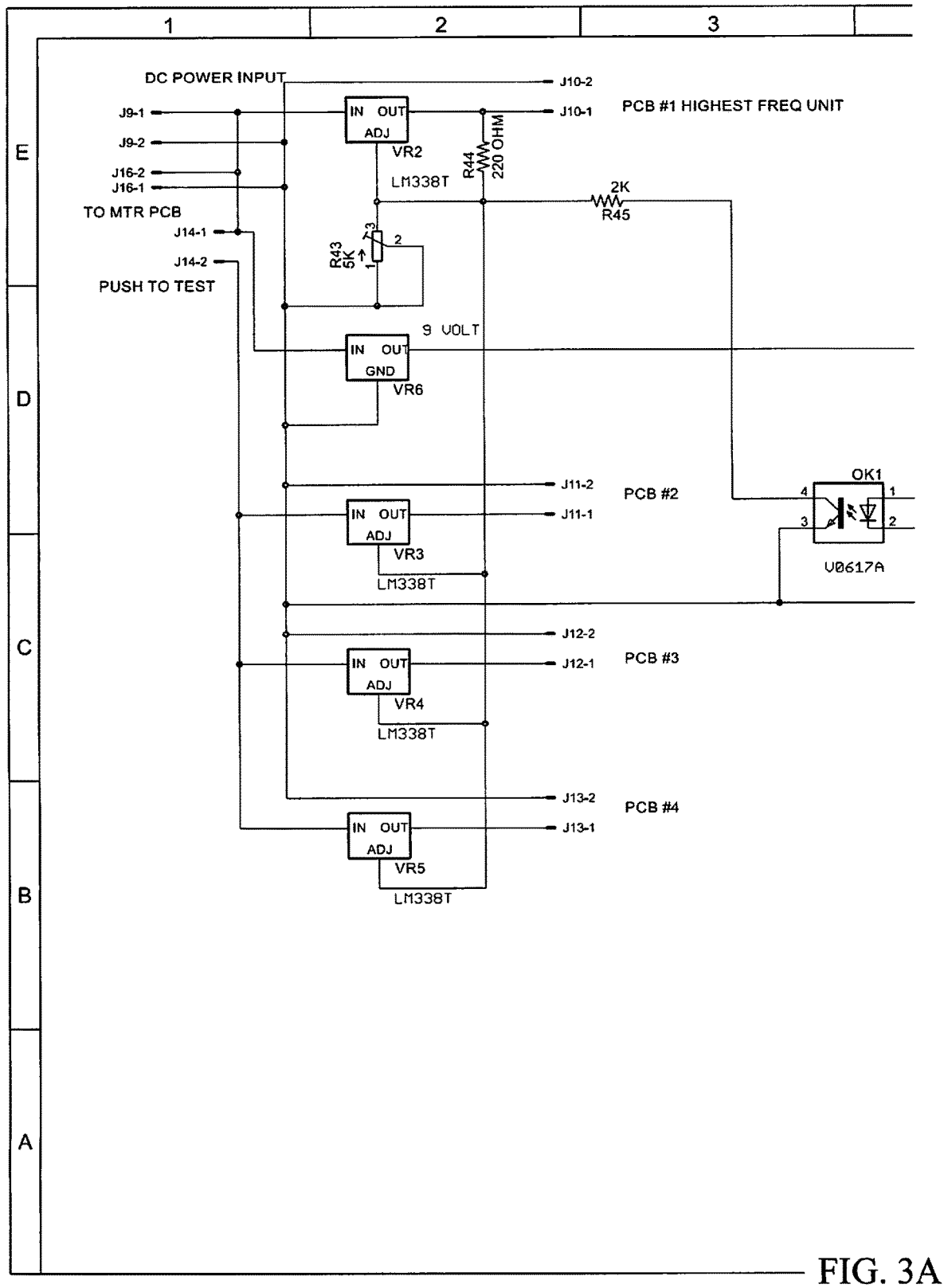
FIG. 3A and FIG. 3B combine illustrate an electrical schematic for one embodiment of the voltage control board of the system.
Figure 3B:
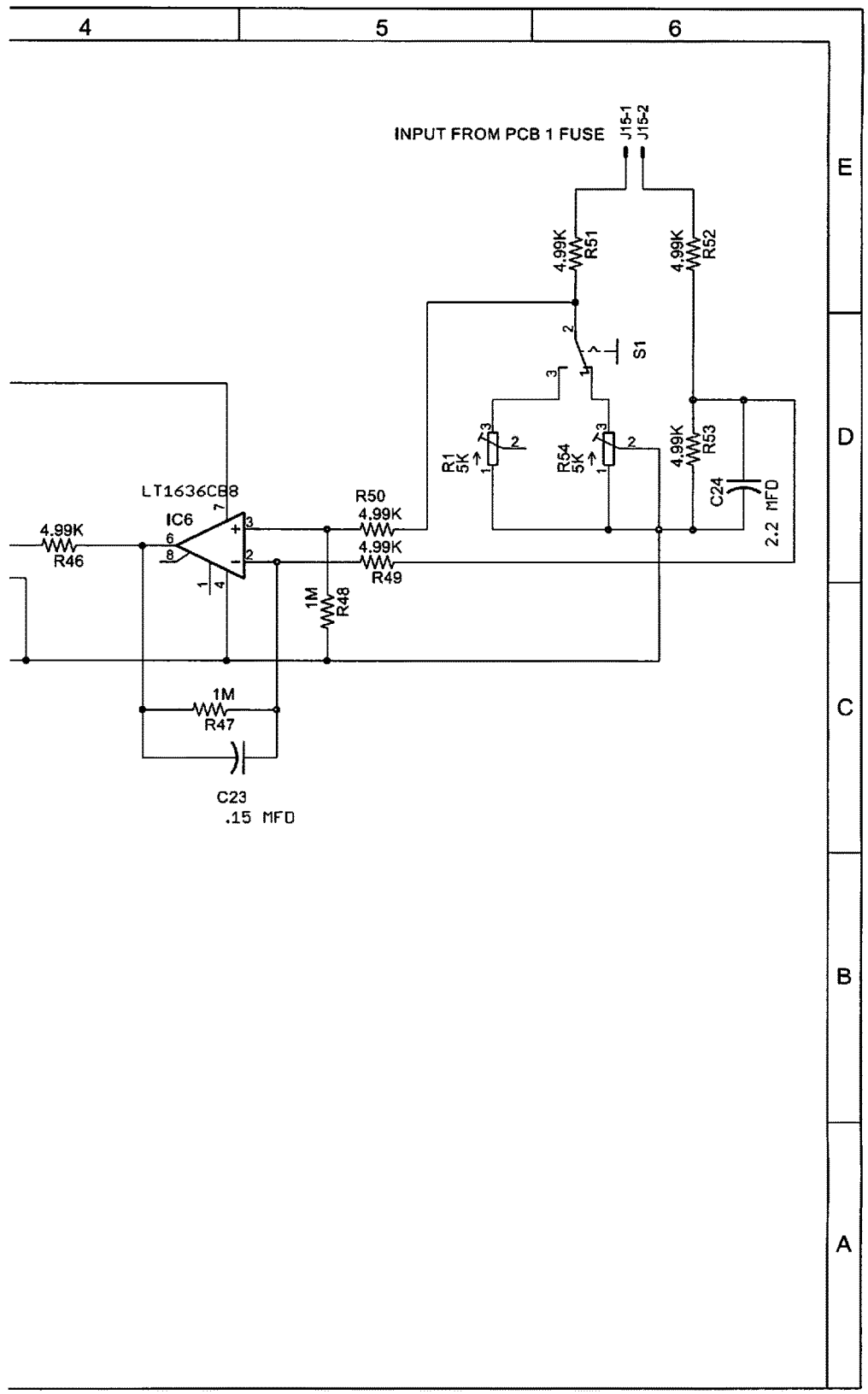
Figure 4:
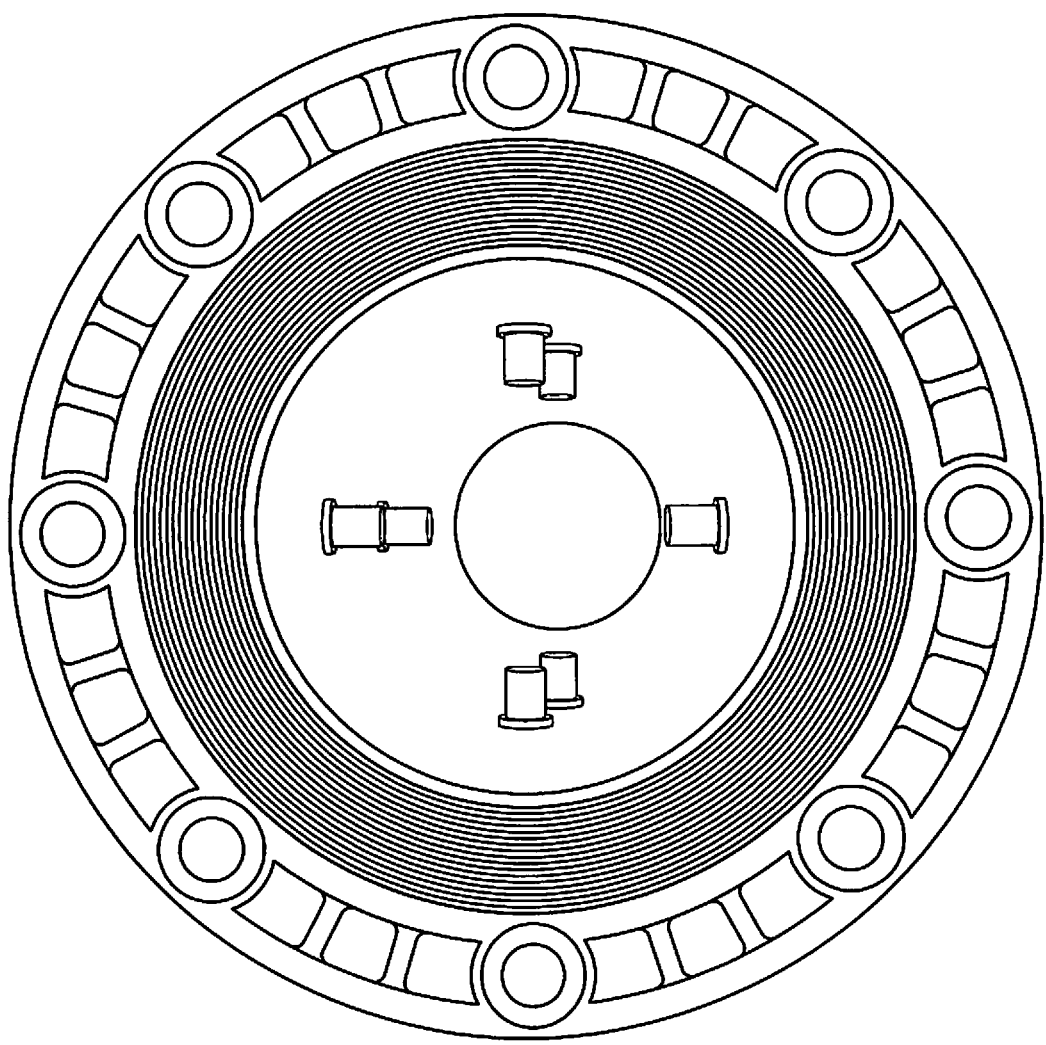
FIG. 4 is an inside view of the energy chamber showing shorter electrodes protruding into the fluid passageway.
Figure 5:
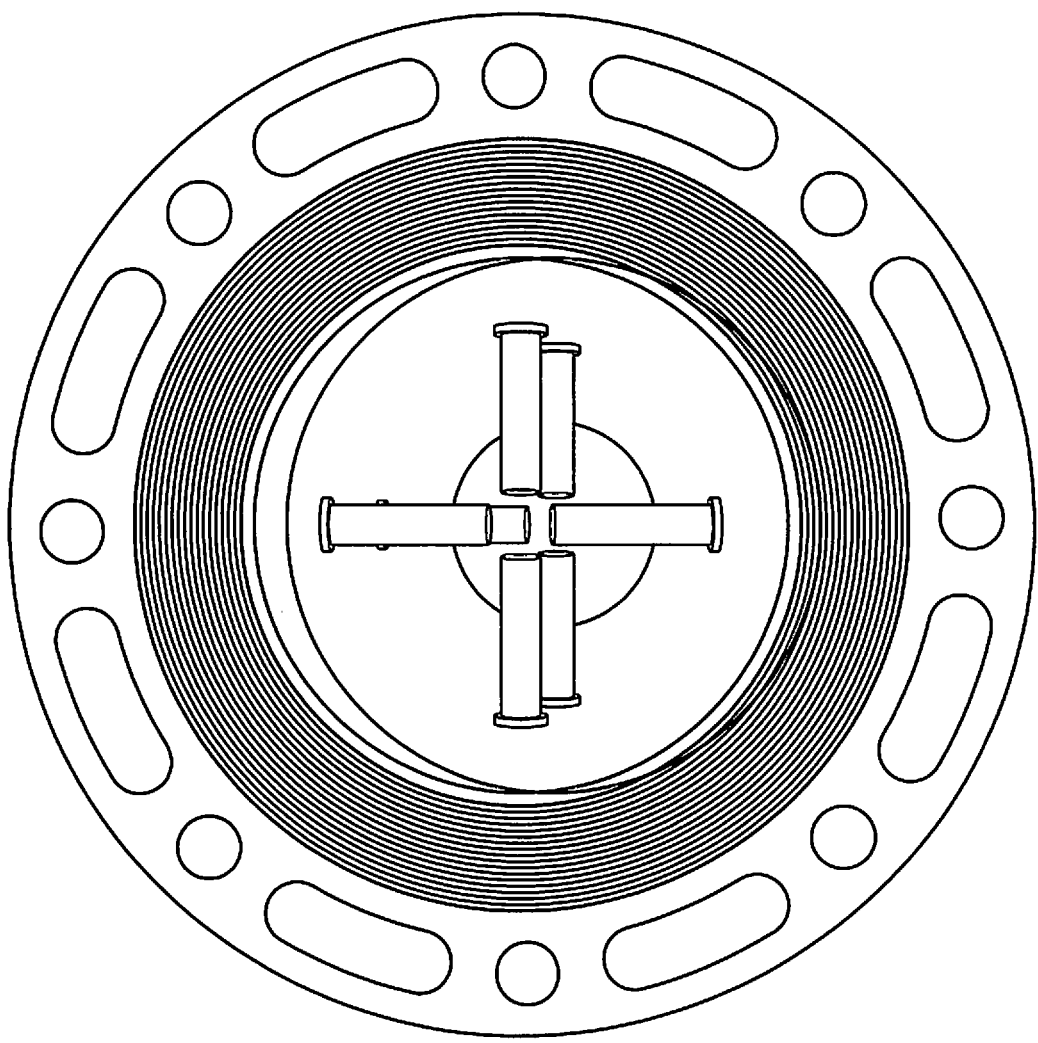
FIG. 5 is an inside view of the energy chamber showing longer electrodes protruding into the fluid passageway.
Figure 6:
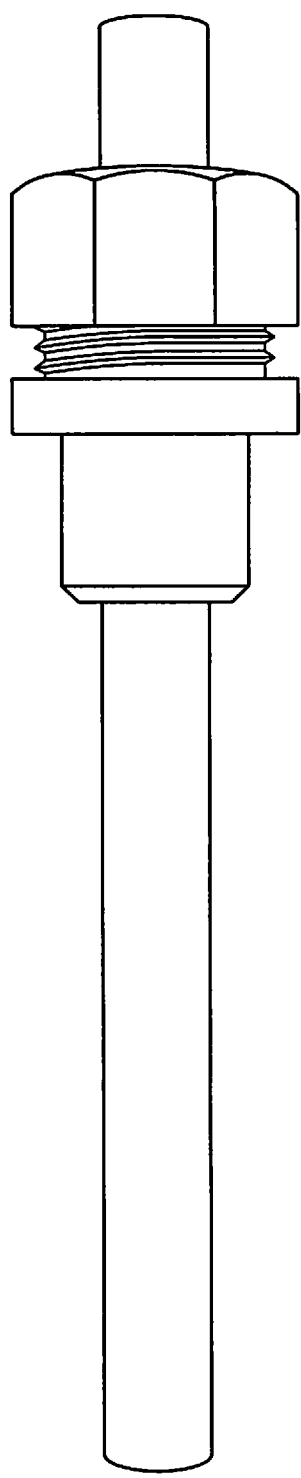
FIG. 6 is a perspective view of a longer electrodes such as the electrodes shown in FIG. 5.
Figure 7:
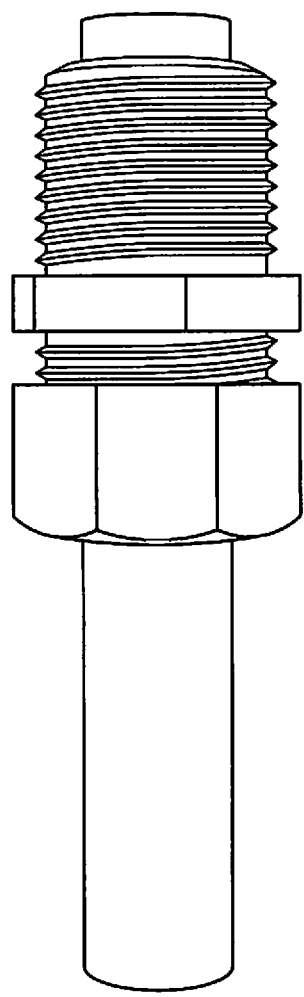
FIG. 7 is a perspective view of a shorter electrode such as the electrodes shown in FIG. 4.
Figure 8:
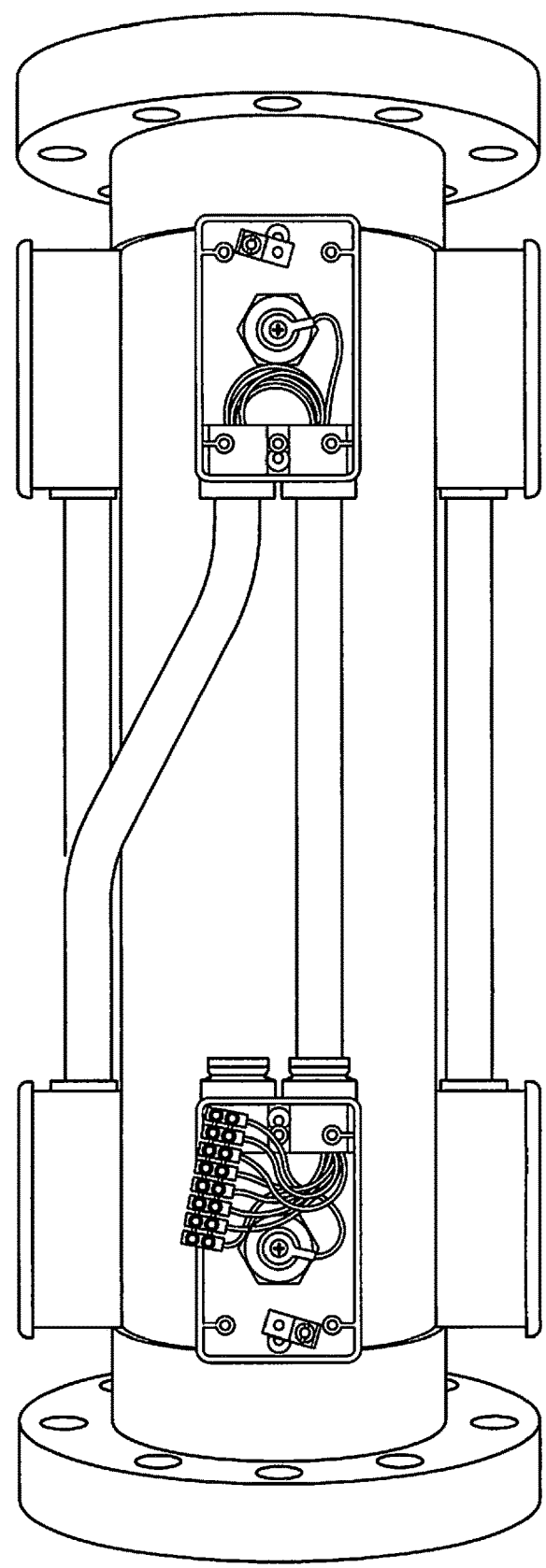
FIG. 8 is an external perspective view of the energy chamber and showing the wiring boxes for energizing the electrodes through the connecting cable causing the electrodes to be energized by the controller.
Figure 10:
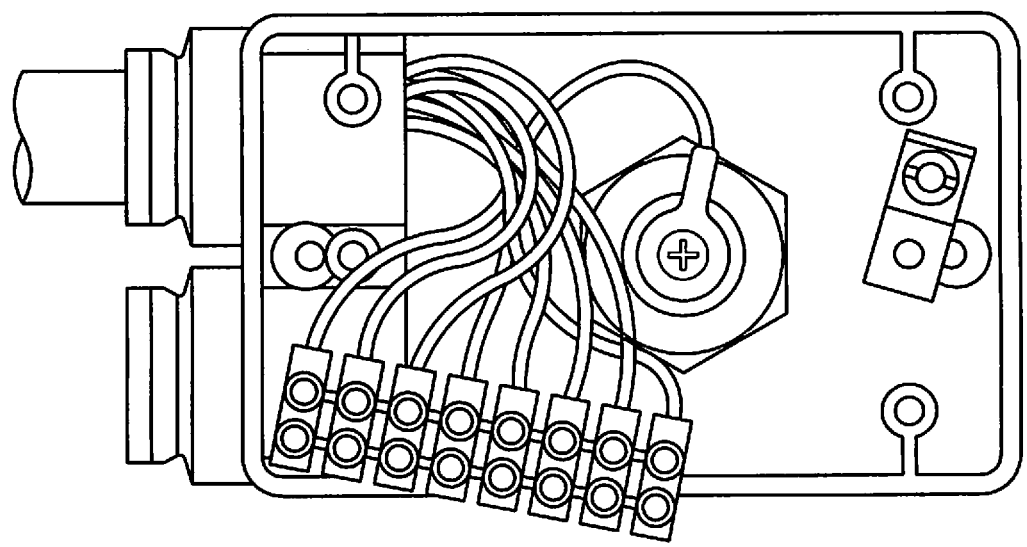
FIG. 10 is a close up perspective view of another of the electrical wiring boxes of the energy chamber.
Figure 9:
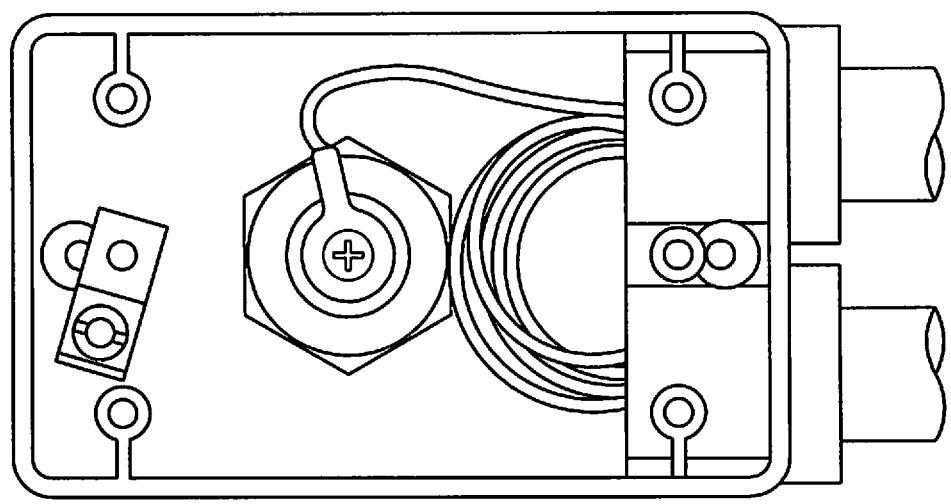
FIG. 9 is a close up perspective of one of the wiring boxes of the energy chamber.
Figure 11:
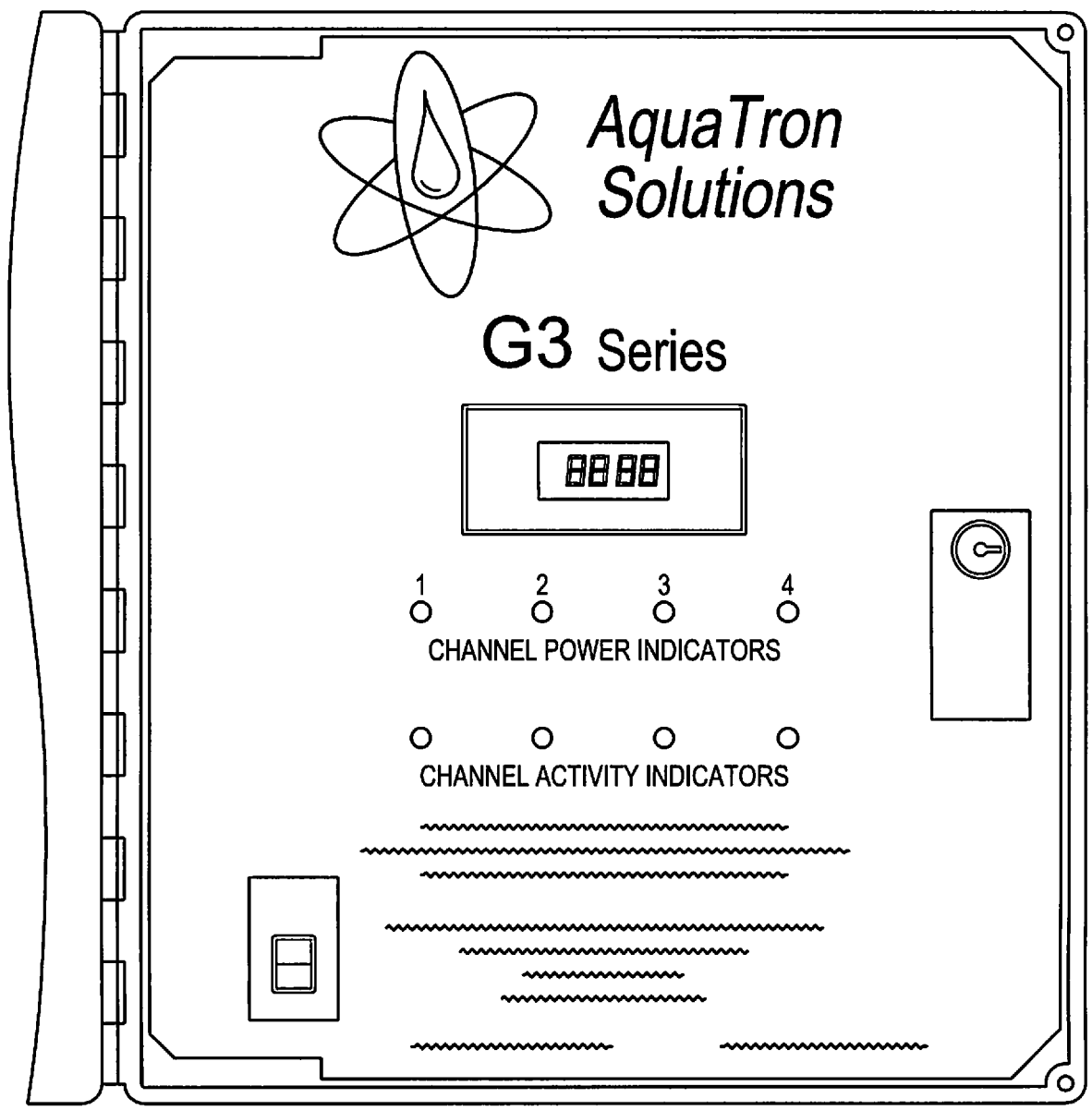
FIG. 11 is a perspective view of one non-limiting embodiment of the housing for the electronic controller/circuitry.
Figure 12:
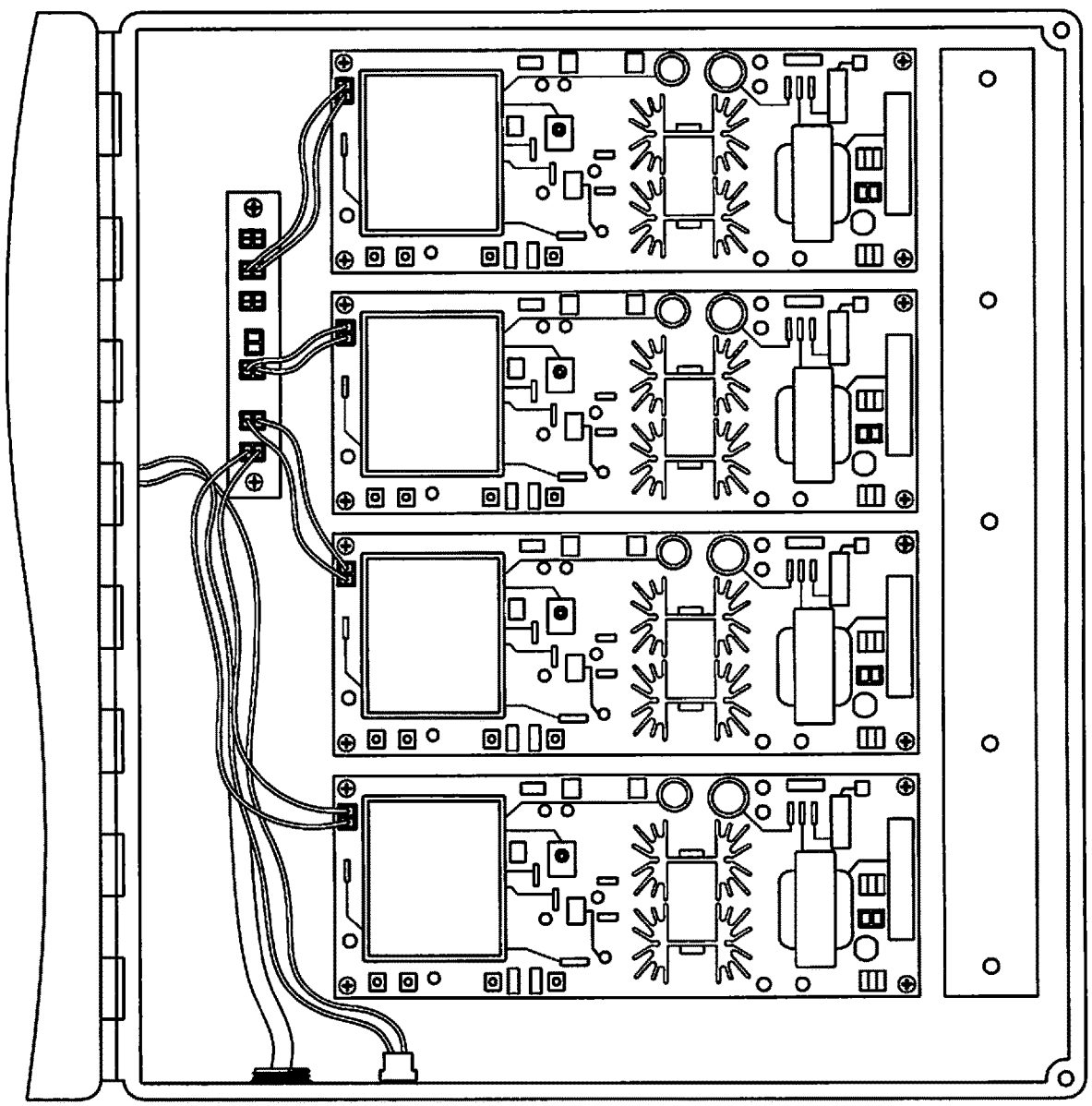
FIG. 12 is a perspective view of one non-limiting embodiment of the actual circuitry for the electronic controller/printed circuit boards.
Figure 13:
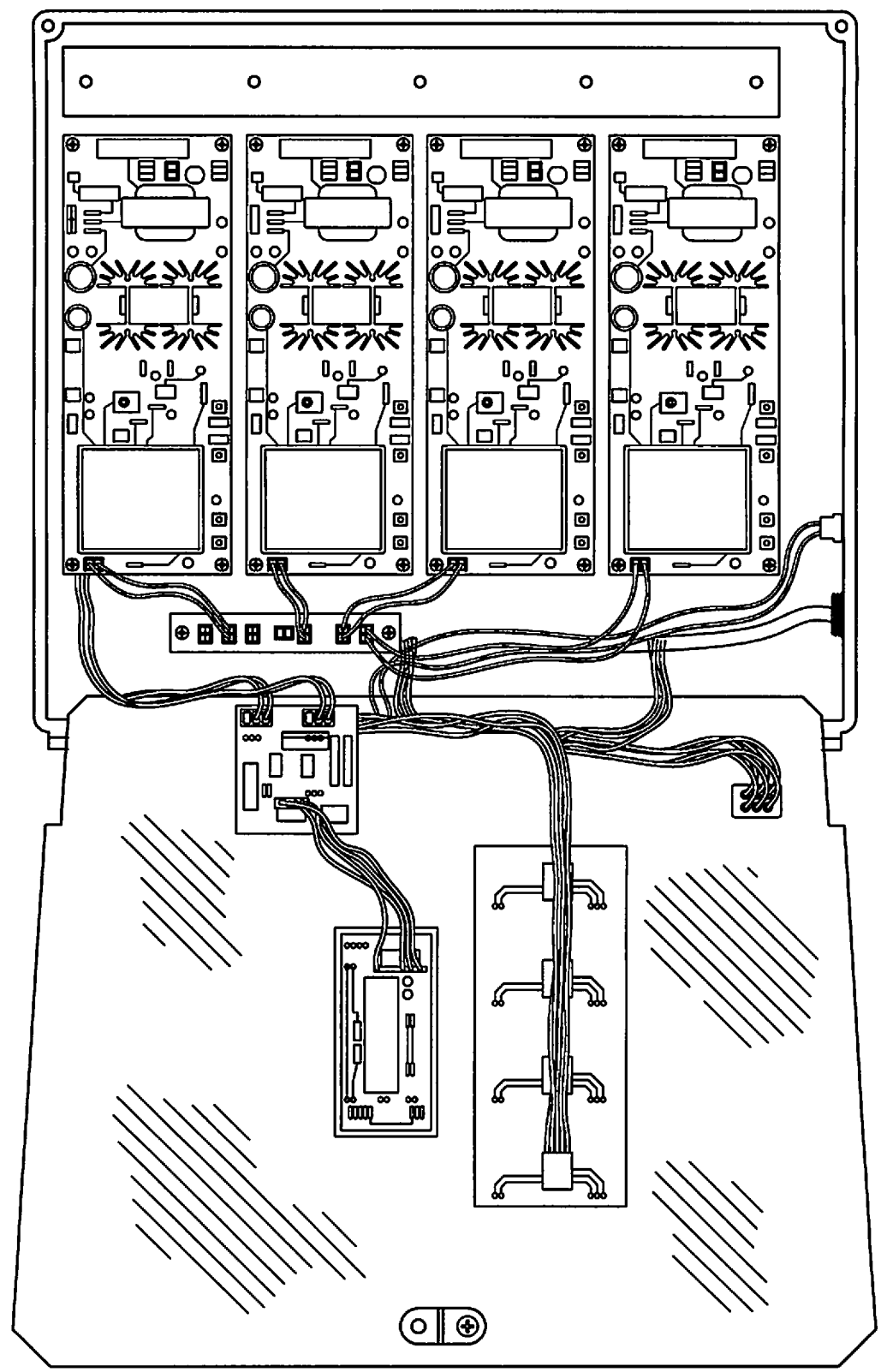
FIG. 13 is a perspective view of the circuitry/printed circuit boards of FIG. 12 in electrical communication with the lights/LED and peak energy reader display secured to the cover/lid of the housing of FIG. 11.
Figure 14:
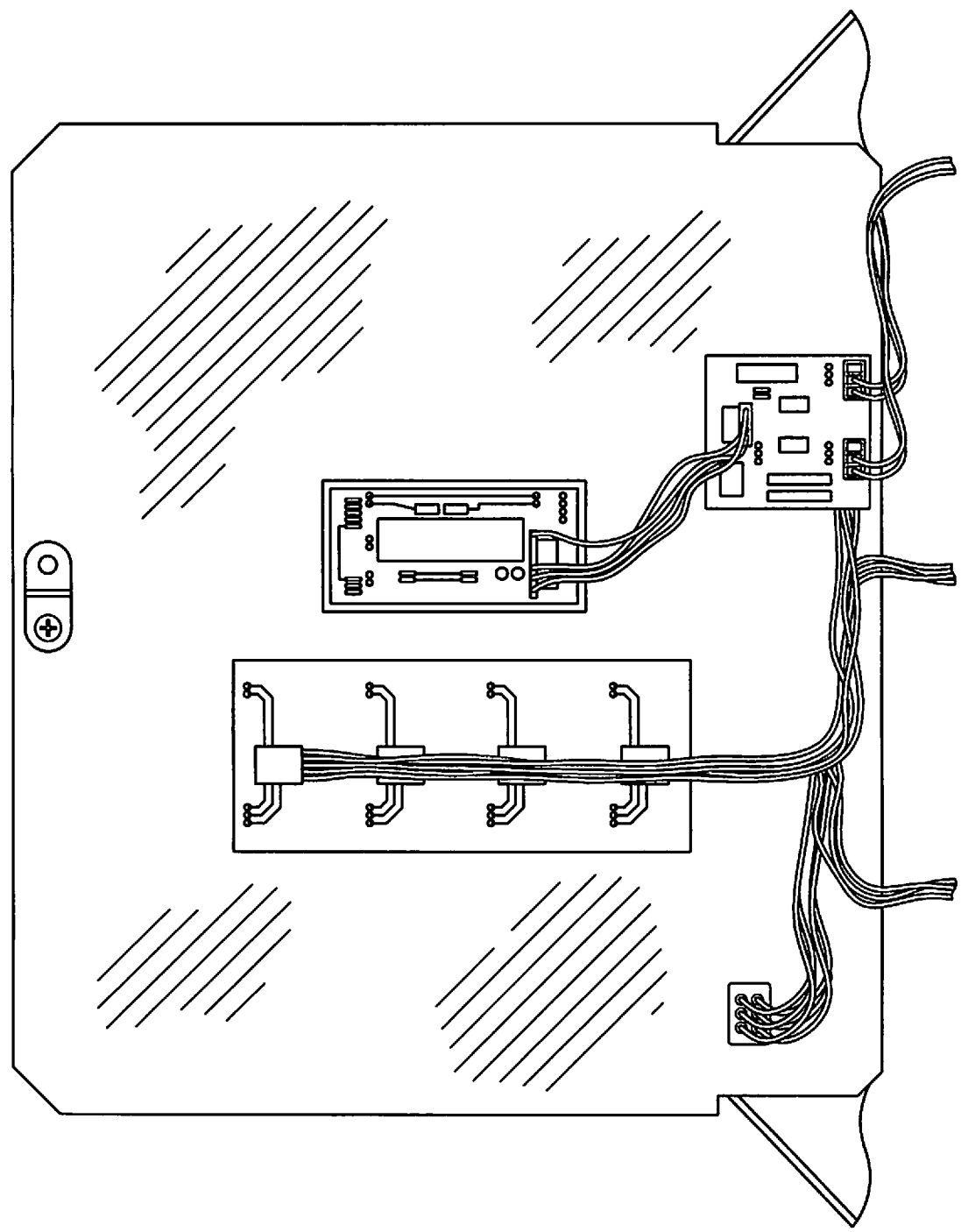
FIG. 14 is a close up perspective view of the electrical connection for the housing cover/lid of FIG. 13.

FIG. 3A and FIG. 3B show the voltage control board. Printed circuit board (PCB) #1 is the highest frequency board and PCB #4 is the lowest frequency board.

In one non-limiting embodiment, a 3-inch chamber can be used incorporating ½ inch diameter electrodes, which allows the system to preferably operate with conductivities up to Certain non-limiting features of the above described electronic controller will be highlighted below. The electronic controller can be provided with a sweep circuit that produces a repeatable or more repeatable zero amplitude voltage. The circuit allows the sweep to be adjusted by adjusting the sweep amplitude to a specific point. Switch and associated circuitry preferably can be included to automatically produce either a bilateral or single pulse signal. The single pulse signal can alternate polarity at a specific time period (e.g. every 10 sec, etc.) preferably by use of a corresponding timer (e.g. 10 sec timer, etc.).

When the controller is used in a single mode of operation, a sync connection can be employed and connected to each time (i.e. 10 sec time, etc.) of the preferred multiple main PCB (printed circuit board) operation to insure that all single pulses are in unison.

The system/circuitry preferably includes switch circuitry to change from bilateral operation to continuous time period operation (i.e. 10 sec) in one polarity only and then switching to the opposite polarity, as well as jumper selection for continuous single polarity only. The system can also include output headers to select double single polarity or single pure rectangle signals that are derived through the use of a custom pulse transformer to produce closer rectangle type signals. A sync pulse can also be available to sync multiple PCBs in the auto 10 sec alternating mode so pulse direction can all coincide.

Pulse widths can be adjustable from about 50 u sec to about 25 u sec, which can result in an equivalent single burst of between about 10 Kc to 20 KC with an adjustable repetition rate.

A primary objective of the bilateral signal is to generate an equal alternating pulse to discourage electrode contamination, scale build-up, electrode erosion and to enhance the liquid medium with larger power through a larger peak to peak voltage pulse.

The electronic controller uses a transformer that allows the circuitry to produce a rectangular output pulse have a peak to peak output variation of approximately 70 volts over a 300 to 5000 ohm load range. Thus, when using the controller in the single mode, the variation can be approximately only 35 volts. With this low transformer voltage variation a meter sensing and detector circuit can be developed and employed for indicating a peak power reading. Using a relatively small sensing resistor in series with the output signal to the energy chamber allows, with a peak detection circuit across the sense resistor and a calibration adjustment, to calibrate a non-decimal point 2 volt meter (with 3 zeros) to indicate equivalent power preferably up to 2000 watts. With the metering circuit, where there is no liquid in the energy chamber, the meter can indicate zero as there is no current through the sense resistor. Thus, the sensing circuit allows the voltage to each individual printed circuit board to be controlled, which allows the system to operate automatically over a relatively larger conductivity range with minimal electrode adjustments. Also the PC terminal block can be removed.

The controller can be provided with additional output signals/ports through the use of a preferred full wave bridge when the system is operating in a bilateral mode. By selecting the full wave bridge output, a double single pulse output can be provided. By selecting half (½) of the diode bridge, a single pulse can be produced. The pulses can be continuous versus an alternative single pulse operation which can also be provided by the controller. By selecting the double single pulse output, double the average power over the single pulse operation is provided. The additional output ports are preferably used for applications where bacterial reduction is required, though such is not considered limiting.

The controller also incorporates printed circuits that eliminate spikes on the leading edge of the monitoring signal and which simplify the calibration.

In use the described fluid conditioning system energizes water with the energy chamber preferably between two sets of electrodes per circuit printed board. The signal generated across the electrodes comprises a sweeping frequency of a rectangle wave, preferably going positive and then negative on an alternating basis. During each positive or negative pulse an electrolysis process can be achieved instantaneously separating the oxygen and the hydrogen electrons. The process performed by the described system can generate instantaneous peak to peak pulse power in the preferred range of about 1000 to about 1500 watts, which allows the system to make water "wetter".

Though not considered limiting, it is preferred that the system/circuitry be provided with universal switching and regulated power supply that at complies with worldwide input voltage Standards, maintains a regulated voltage for system repeatability and reliability, and conforms to the "New Green" power efficiencies as directed by many local, state, federal and/or country regulations, rules or laws.

Additionally, it is preferred that the system/circuitry be provided with the use of a stable rectangle signal generating source, which in one non-limiting embodiment, can be accomplished through the use of an integrated circuit designed for rectangular signal generation. With this source, a determined signal pulse width can be established to perform to the desired end results with a varying or controlled repetition rate (frequency).

It is also preferred that the system/circuitry use a multiple function signal generating source that, with a selected waveform at very low settable frequencies, may be applied to the above-mentioned rectangle signal generator. For certain applications, a specific range or span of signal repetition rates (frequencies) may be needed to perform or to acquire specific results.

Furthermore, the system/circuitry can generate multiple forms of output signals applied to the water depending upon the desired application/use (i.e. plant growth, water saving, insect control, standard spray irrigation, hydroponics growing, combination of two or more, etc.). A desired application may need the generation of either a single positive or negative pulse revolving about zero, each for a predetermined period of time or for a bilateral pulse revolving around zero.

When producing a bilateral pulse, the first positive pulse is generated directly from the rectangle signal generating source and inverted into a positive pulse. This positive pulse can also be sent to a "one shot" single pulse generator that produces a controlled positive pulse width signal on the falling edge of the input pulse. Thus, two separate inline positive pulses are created that can be fed into a dual power FET (field effect transistor) driver which insures a "hard" turn on of the power FET's which can be connected to the output transformer.

To generate individual, either positive or negative pulses for a short period of time, a long duration square wave timer can be developed, such as, but not limited to, approximately 15 sec ON and 15 sec OFF. The output signal can be fed (1) thru ½ of a manual selector switch and then to the control input of an electronic switch that either turns ON or OFF the first positive pulse in section A. The output signal can also be applied to a signal inverter, with its output fed thru the $2^{nd}$ half of a manual selector switch and then to the control input of a second electronic switch. This second electronic switch can either turn ON or OFF the output of the "one shot" single pulse generator. The resultant signal can be a series of pulses for 15 seconds to the $1^{st}$ input of the dual FET driver and then a series of pulses for another 15 seconds to the $2^{nd}$ input of the dual FET driver.

To generate the desired choice of output signals, a dual primary winding transformer is provided for use. The primary windings can be connected in series with the main power connected to the center tap section of the winding. The power FET's can be connected to the opposing ends of the primary windings. Each FET can be energized in sequence, generating alternating signals due to the transformer phasing. The output of the transformer can be wound to produce a stepped up voltage pulse. A dummy load can be connected across the transformer output which prevents excessive high voltage pulses due to system operation without water applied to the system energy chambers and to prevent arcing or voltage breakdown from secondary to primary.

Thus, with the selection of the manual selector switch position, an alternating or bilateral pulsed signal can be generated or a series of positive or negative pulses over a 15 sec period of time may be generated. With the use of the 15 sec alternating pulse system, the electrolysis effect on the electrodes is reduced by "auto electrode cleaning".

Thus, through use of the disclosed system, the following benefits and/or advantages include, but are not limited to: (1) increases fluid penetration of soils, wood, plants, any inert substance; (2) increases plant hydration; (3) increases soil hydration; (4) shortens germination time; (5) faster growing plants; (6) healthier seedlings; (7) increases aerobic bacteria population in soil; (8) increases crop yields; (9) help produce plants with more vibrant root systems; and (10) cleans out pipes, holding and carrying containment.

All locations, sizes, shapes, measurements, amounts, angles, voltages, frequencies, ranges, component or part locations, configurations, temperatures, weights, dimensions, values, percentages, materials, orientations, etc. discussed above or shown in the drawings are merely by way of example and are not considered limiting and other locations, sizes, shapes, measurements, amounts, angles, voltages, frequencies, ranges, component or part locations, configurations, temperatures, weights, dimensions, values, percentages, materials, orientations etc. can be chosen and used and all are considered within the scope of the invention.

Dimensions of certain parts as shown in the drawings may have been modified and/or exaggerated for the purpose of clarity of illustration and are not considered limiting. Component values shown in the drawings, including the electrical schematics, are merely examples of component values and part numbers that can be used and the present disclosure is not considered limited to these specific component values and part numbers.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosed system, and rights to such alternatives are particularly reserved and considered within the scope of the invention.

What is claimed is:

1. A fluid conditioning and treatment system, comprising:
   an electronic controller having a plurality of energy producing circuits with each of the plurality of energy producing circuits generating its own output signal, the electronic controller including a first oscillator configured as a variable pulse width, variable pulse rate generator and a second oscillator configured as a variable triangle wave generator arranged to control the frequency of the first oscillator;
   an energy delivery module ("energy chamber") in electrical communication with the electronic controller, the energy delivery module having a housing adapted for fluid communication securement with an existing fluid line, the housing having a wall defining an internal passageway, the energy delivery module having a plurality of electrodes protruding through the wall and extending into the internal passageway for contacting fluid flowing through the internal passageway and conveying energy received from the electronic controller to the fluid traveling through the internal passageway, the plurality of electrodes statically arranged with respect to each other, the plurality of electrodes grouped in pairs and each electrode group pair specifically associated with and only in electrical communication with a specific one of the plurality of energy producing circuits and not the remaining energy producing circuits of the plurality of energy producing circuits and only receives an output signal generated by the specific one of the plurality of energy producing circuits to avoid mixing of signals generated by the plurality of energy producing circuits.

2. The fluid conditioning and treatment system of claim 1 further comprising a cable having a first end and a second end, said first end of said cable plugged in to said electronic controller and said second of said cable plugged in to said energy chamber for providing communication between the electronic controller and the energy delivery module.

3. The fluid conditioning and treatment system of claim 1 wherein said electronic controller housed within a fiberglass enclosure.

4. The fluid conditioning and treatment system of claim 1 wherein said electronic controller generating and transmitting preprogrammed high-energy electronic signals to the energy chamber through an interconnecting cable.

5. The fluid conditioning and treatment system of claim 1, wherein each of said electrodes having a contact end that is disposed within the internal passageway.

6. The fluid conditioning and treatment system of claim 5 wherein the contact ends of the electrodes contact fluid flowing through the internal passageway of the energy chamber.

7. The fluid conditioning and treatment system of claim 6, wherein the plurality of energy producing circuits that are programmed to produce precisely a given range of electronic output signals that are sent to the electrodes and that when applied to the fluid accomplishes specific functions.

8. The fluid conditioning and treatment system of claim 6, wherein the controller can be programmed to supply a number of electronic hits that are sent to the electrodes and are applied to the fluid as the fluid passes through the internal passageway of the energy chamber.

9. The fluid conditioning and treatment system of claim 1, wherein the energy chamber is installed within an irrigation pipe line in order to treat fluid being applied to a crop.

10. The fluid condition and treatment system of claim 1, wherein the electronic controller having a sweep circuit for producing a repeatable zero amplitude voltage.

11. The fluid conditioning and treatment system of claim 1, wherein the electronic controller producing a rectangular output pulse having a peak to peak variation of about 70 volts over a 300 to 5000 ohm load range.

12. The fluid conditioning and treatment system of claim 1 further comprising a meter sensing and detector circuit in communication with the electronic controller, said meter sensing and detector circuit indicating a peak power reading.

13. The fluid conditioning and treatment system of claim 1 wherein said electronic controller having a full wave diode bridge circuitry to provide additional output signals for the electronic controller component.

14. The fluid conditioning and treatment system of claim 1 wherein the electronic controller having circuitry to produce a bilateral pulse having a first positive pulse generated directly from a rectangle signal generating source and inverted into a positive pulse, wherein the positive pulse is sent to a "one shot" single pulse generator to produce a controlled positive pulse width signal on the a falling edge of an input pulse and represents the second positive pulse of the bilateral pulse, wherein the two separate inline positive pulses of the bilateral pulse are fed into a dual power field effect transistor driver.

15. The fluid conditioning and treatment system of claim 1, wherein each energy producing circuit having output circuitry generating bilateral output signals of either positive or negative signals only and eliminating opposite inductive signals, wherein the bilateral output signals generating an equal alternating pulse that is delivered to a specific pair of electrodes in electrical communication with a specific energy producing circuit for discouraging contamination and erosion of the pair of electrodes, discouraging scale build-up and supplying a larger power to the fluid traveling through the internal passageway through a larger peak to peak voltage pulse.

16. A fluid conditioning and treatment system, comprising:
an electronic controller, the electronic controller having a plurality of energy producing circuits with each of the plurality of energy producing circuits generating its own output signal, the plurality of energy producing circuits that are programmed to produce precisely a given range of electronic output signals, the said electronic controller component having a sweep circuit for producing a repeatable zero amplitude voltage, the electronic controller component including a transformer and producing a rectangular output pulse having a peak to peak variation of about 70 volts over a 300 to 5000 ohm load range, the electronic controller including a first oscillator configured as a variable pulse width, variable pulse rate generator operating in an ELF spectrum between 0 to 3 kHz and capable of producing a rectangular waveform timer; the electronic controller also including a second oscillator configured as a variable triangle wave generator operating in a sub audio spectrum between 9 KHz and 300 GHz for sweeping frequencies of the first oscillator in a linear manor; and an energy delivery module ("energy chamber") in electrical communication with the electronic controller, said energy chamber having a wall defining an internal passageway and a series of computer designated, matched electrodes placed through the walls, each of said electrodes having a contact end that is disposed within the internal passageway, the series of electrodes conveying energy received from the electronic controller to the fluid traveling through the internal passageway, the series of electrodes statically arranged with respect to each other, the series of electrodes grouped in pairs and each electrode group pair specifically associated with and only in electrical communication with a specific one of the plurality of energy producing circuits and not the remaining energy producing circuits of the plurality of energy producing circuits and only receives an output generated by the specific one of the plurality of energy producing circuits to avoid mixing of signals generated by the plurality of energy producing circuits;

wherein the output signals of the electronic controller component are sent to the electrodes and when fluid flows through the internal passageway the electronic output signals are applied to the fluid to accomplish one or more desired applications.

17. The fluid conditioning and treatment system of claim 16, wherein the energy chamber is installed within an irrigation pipe line in order to treat fluid being applied to a crop.

18. The fluid conditioning and treatment system of claim 16 further comprising a meter sensing and detector circuit in communication with the electronic controller, said meter sensing and detector circuit indicating a peak power reading.

19. The fluid conditioning and treatment system of claim 18 wherein said electronic controller housed within an enclosure, the enclosure having a cover, the cover housing a plurality of channel power indicator lights and a plural of channel activity indicator lights that are in communication with the electronic controller and a peak energy reading display that is in communication with the meter sensing and detector circuit.

20. The fluid conditioning and treatment system of claim 16, wherein the electronic controller can be programmed to supply a number of electronic hits that are sent to the electrodes and are applied to the fluid as the fluid passes through the internal passageway of the energy chamber.

* * * * *